US008123345B2

(12) United States Patent
Kovacs et al.

(10) Patent No.: US 8,123,345 B2
(45) Date of Patent: Feb. 28, 2012

(54) SYSTEM AND METHOD FOR LEVELING APPLIED INK IN A PRINTER

(75) Inventors: Gregory Joseph Kovacs, Webster, NY (US); Ashish Pattekar, Cupertino, CA (US); David K. Biegelsen, Portola Valley, CA (US); Lars Erik Swartz, Sunnyvale, CA (US); Jennifer L. Belelie, Oakville (CA); Peter Gordon Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 602 days.

(21) Appl. No.: 12/023,979

(22) Filed: Jan. 31, 2008

(65) Prior Publication Data

US 2009/0195572 A1 Aug. 6, 2009

(51) Int. Cl.
*C09D 11/00* (2006.01)

(52) U.S. Cl. ........................................................ 347/100

(58) Field of Classification Search ........................ None
See application file for complete search history.

(56) References Cited

U.S. PATENT DOCUMENTS 5,140,377 A 8/1992 Lewis et al.
6,067,437 A * 5/2000 Schonfeld .................... 399/320
6,827,435 B2 12/2004 Domoto et al.

* cited by examiner

*Primary Examiner* — Matthew Luu
*Assistant Examiner* — Alejandro Valencia
(74) *Attorney, Agent, or Firm* — Maginot, Moore & Beck, LLP

(57) ABSTRACT

A system enables ink on an image receiving member to be re-distributed to reduce banding effects in the image. The system includes an ink applicator for applying ink to form an ink image on an image receiving member as it passes by the ink applicator; a plenum chamber for receiving a flow of pressurized fluid from a fluid source, and at least one opening in the plenum chamber to direct the flow of pressurized fluid from the plenum towards the ink image on the image receiving member to re-distribute the ink on the image receiving member.

15 Claims, 4 Drawing Sheets

SYSTEM AND METHOD FOR LEVELING APPLIED INK IN A PRINTER

TECHNICAL FIELD

The device and method described herein generally relate to printers that generate images on media with gel inks. More specifically, the device and method relate to printers in which the gel inks are applied directly from a print head to the media.

BACKGROUND

Lithographic, flexographic, and gravure printing techniques have been refined and improved for many years. The basic principle of lithography is transferring ink from a surface having both ink-receptive and ink-repellent areas that comprise an image. Offset printing incorporates an intermediate transfer of the ink. In offset printing, an offset lithographic press transfers ink from a plate on a rotating cylinder to a rubber blanket cylinder, and then the blanket cylinder transfers the image to a substrate, which may be either a cut sheet or a web substrate. In flexographic printing, the ink is picked up in ink pockets on an anilox roll and transferred to a rubber plate having raised image areas that is mounted on a rotating cylinder. The flexographic plate then transfers the image to a sheet or web substrate. In gravure printing, engraved ink wells are arranged on a cylinder to form an image. When the ink wells contain ink and make direct contact with a sheet or web substrate, an ink image is transferred from the cylinder onto the substrate. The flexographic and gravure methods are especially useful for printing onto a web of film or foil material. After printing, the web material may be cut into sections that are formed into containers, such as bags, for food products, such as potato chips. For high durability images, the printing may be done with UV curable inks using UV-flexo techniques. Following transfer of the UV ink image from a plate on a rotating cylinder to a substrate, the ink image is cured by exposing the image to UV light. Typically, each color image is cured before the next color image is applied to the substrate.

The methods of printing described above are limited by the requirement that a cylinder or other ink transfer member be produced with ink receptive and ink repellant areas, or with raised or depressed areas, or with ink receptive pockets, for the collection of ink to transfer the ink to a substrate and form an image. Thus, these methods are particularly adapted for printing an image numerous times. If the printed image is to have a short run, such as a single copy of the image, then digital printing techniques are more advantageous. Ejecting inks from a print head is one method of digital printing that is well developed.

Ejecting UV curable inks, which have a sufficiently low viscosity that enables the ink to be jetted from a print head, onto porous substrates, such as plain paper, will generally, at room temperatures, result in rapid lateral and depth penetration of the ink into the substrate. These results produce poor edge acuity and showthrough of the images. Therefore, UV gel inks have been developed. These gel inks are relatively solid. That is, these inks have a viscosity between $10^5$ and $10^7$ cps at temperatures below a threshold, such as 75° C. When heated to temperatures above the threshold, these gel inks become liquid and are capable of being ejected from a print head. The inks then freeze into a gel state on contact with the substrate, which prevents spreading of the ink along the substrate and penetration of the ink into the substrate. Consequently, different images can be printed by controlling the ejectors in the print head in a manner known for ink jet and solid ink printers. The ejected gel ink is then cured on the image substrate by exposure to ultraviolet (UV) light.

UV gel inks are described in Copending Application U.S. Ser. No. 11/290,202, filed Nov. 30, 2005, entitled “Phase Change Inks Containing Photoinitiator With Phase Change Properties and Gellant Affinity,” with the named inventors Peter G. Odell, Eniko Toma, and Jennifer L. Belelie, the disclosure of which is completely incorporated herein by reference. That application discloses a phase change ink comprising a colorant, an initiator, and an ink vehicle. The ink vehicle comprises (a) at least one radically curable monomer compound, and (b) a compound of the formula:

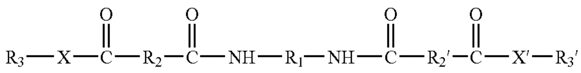

wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula —$NR_4$—, wherein $R_4$ is a hydrogen atom, an alkyl group, an aryl group, an arylalkyl group, or an alkylaryl group.

Copending Application U.S. Ser. No. 11/290,121, filed Nov. 30, 2005, entitled “Phase Change Inks Containing Curable Amide Gellant Compounds,” with the named inventors Eniko Toma, Jennifer L. Belelie, and Peter G. Odell, the disclosure of which is completely incorporated herein by reference, describes a phase change ink comprising a colorant, an initiator, and a phase change ink carrier. The phase change ink carrier of that application comprises at least one radically curable monomer compound and a compound of the formula:

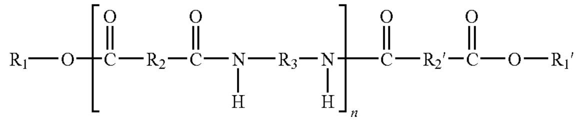

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

Copending Application U.S. Ser. No. 11/289,615, filed Nov. 30, 2005, entitled “Radiation Curable Ink Containing A Curable Wax,” with the named inventors Jennifer L. Belelie, et al., the disclosure of which is completely incorporated herein by reference, describes a radiation curable ink comprising a curable monomer that is liquid at 25° C., curable wax and colorant that together form a radiation curable ink. This ink may be used to form images by providing the radiation curable ink at a first temperature; applying the radiation curable ink to the substrate to form an image, the substrate being at a second temperature, which is below the first temperature; and exposing the radiation curable ink to radiation to cure the ink.

In summary, the UV gel inks described above may be used to form images on paper webs or sheets as well as on film or foil webs or sheets. Showthrough or bleeding occurs when a liquid ink penetrates a porous image substrate, such as paper. Gel inks do not penetrate porous substrates as they cool and return to gel form following ejection from the heated print head. Thus, showthrough or bleeding is prevented. Additionally, gel ink ejected onto a porous substrate can be more thoroughly cured by UV light because the gel ink does not penetrate the porous substrate so fibers of the porous substrate cannot shade the ink from the light. Uncured or incompletely cured ink is undesirable because it is still susceptible to smudge and still capable of releasing odors.

While gel ink enables more facile image printing and printing onto porous substrates, it has been observed as exhibiting microbanding. Microbanding is an uneven distribution of ink in an image area in which the image should be smooth and uniform. Because the ink temperature drops after ejection, the ink freezes on contact with the substrate and an uneven distribution of ink on the image substrate may occur. The uneven distribution can sometimes be observed by the human eye as bands or lines in the direction of the substrate travel past the print head. This uneven distribution might be addressed by leveling the ink on the image substrate with a contact member, such as a roller, belt, or wiper, in an effort to normalize the ink distribution. A heating element may be located near or within the contact member to heat it and consequently soften the ink for the leveling operation.

Leveling the gel ink with a contact member may cause the ink layer to split, however. A portion of the gel ink may be transferred to the contact member and affect the print quality of later processed images. For example, a portion of the ink transferred from a rotating contact member may later be deposited on the media to leave a ghost of the previously leveled image. Further, ink build up on a contact member necessitates either replacement of the contact member or removal of the ink from the contact member on a periodic or occasional basis. Consequently, addressing the microbanding defect of gel ink in an image without splitting the ink or accumulating ink on a contact member would be useful.

SUMMARY

A non-contact method has been devised for leveling gel ink with a fluid flow. This method eliminates the need for a contact member to level the gel ink on an image receiving member. The method includes ejecting ink from a print head to form an image on an image receiving member as it passes by the print head and directing a flow of fluid towards the image on the image receiving member to re-distribute a portion of the ink on the image receiving member. The fluid may be steam or hot air, for example. The fluid flow induces reflow and leveling of the image ink on the image receiving member.

The method may be performed in a printer that produces images with gel ink. The system includes an ink applicator for applying gel ink to an image receiving member as it passes by the ink applicator, a fluid flow directing device configured to direct a flow of fluid towards the image receiving member to re-distribute the ink on the image receiving member in order to achieve reflow and leveling of the ink on the image receiving member.

BRIEF DESCRIPTION OF THE DRAWINGS

Features of the fluid flow directing systems and methods disclosed herein will become apparent to those skilled in the art from the following description with reference to the drawings, in which.

DETAILED DESCRIPTION

The term "printer" refers, for example, to reproduction devices in general, such as printers, facsimile machines, copiers, and related multi-function devices. While the specification focuses on a system that forms images with gel inks, the system may be used with any printer that uses inks that change viscosity in response to temperature changes.

Figure 1:
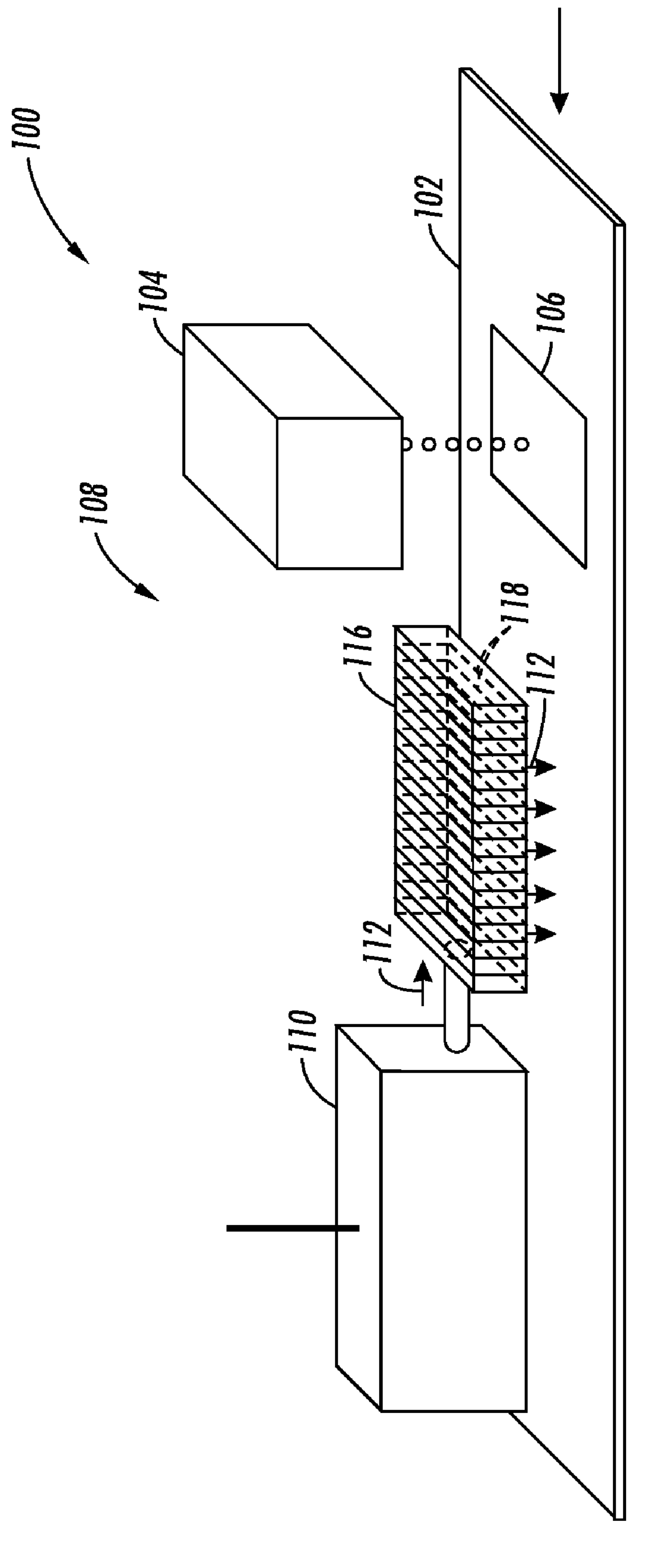
FIG. 1 is a perspective view of a system for leveling ink.

A system 100 for leveling gel ink on an image substrate is shown in FIG. 1. The system 100 includes a print head 104 for ejecting ink onto an image receiving member 102 to form an image 106 as it passes by the print head 104. A fluid flow directing device 108 may include a steam generator 110, a steam knife 116, and a conduit 112 connecting the steam generator and the steam knife. A water source (not shown) supplies water to the steam generator 110, which heats the water to generate steam. The pressure of the steam directs the steam through the conduit 112 to the steam knife 116. The steam knife 116 may be comprised of a plenum subdivided into sections having multiple openings, such as slits 118, that are oriented towards the image receiving member 102. Thus, each chamber directs a portion of the steam towards the image receiving member 102. The resulting plurality of steam jets heats the ink and substrate, both by condensation and convective heat transfer, and redistributes the ink on the image receiving member 102 using thermally induced reflow and/or viscous shear. Alternatively, a hot air knife may be used in place of a steam knife. The hot air knife may be comprised of a blower that directs hot air towards the image receiving member 102. Vanes may be provided in the output stream of the blower to direct multiple streams towards the image receiving member 102.

While the fluid flow directing device is shown in use with a print head 104, the ink may be applied to the image receiving member 102 with any device capable of applying ink onto the image receiving member 102. For example, the ink may be applied to the image receiving member with a platen, such as an engraved plate or cylinder or a rubber relief plate or cylinder, which conveys ink to the image receiving member with the pattern of the plate or cylinder. The image receiving member 102 may be any member capable of receiving ink images. For example, the member 102 may be a roll or a cut sheet of media, such as a roll of packaging material, which is used to form packages for food products.

The fluid flow directing device 108 may be any device that is configured to direct a flow of fluid toward the ink image 106 on the image receiving member 102 to redistribute or level the ink on the image receiving member. The fluid flow directing device may be configured to direct the fluid flow with a particular orientation toward the ink image on the image receiving member. For example, the fluid flow may be normal or perpendicular to the image on the image receiving member. The orientation of the fluid flow may be selected to redistribute the ink optimally. The optimal orientation may be influenced by factors such as the effects of gravity, fluid flow parameters, and the motion of the image receiving member 102.

The steam generator 110 described above may generate steam with a pressure and a temperature selected for optimal redistribution of the ink. For example, the generator 110 may produce super heated steam (steam at a temperature above the boiling point corresponding to the ambient pressure). Alternatively, the steam generator 110 may be replaced with a generator that produces a flow of air or other gas. The gas or air flow may be heated or be at ambient temperature. The air or gas flow, in general, is pressurized to help redistribute the gel ink on the image receiving member. In some cases, however, the heating effect of the fluid or gas alone, without an accompanying shearing arising from high velocity delivery of the fluid or gas, may be sufficient to enable the reflow and leveling of the ink image. Leveling in this manner is possible because reduction of the image ink viscosity by the heated fluid or gas enables the surface tension of the gel ink to minimize the surface area and form a level image. If the fluid is a gas, nitrogen, for example, or another suitable gas may be used.

Figure 2:
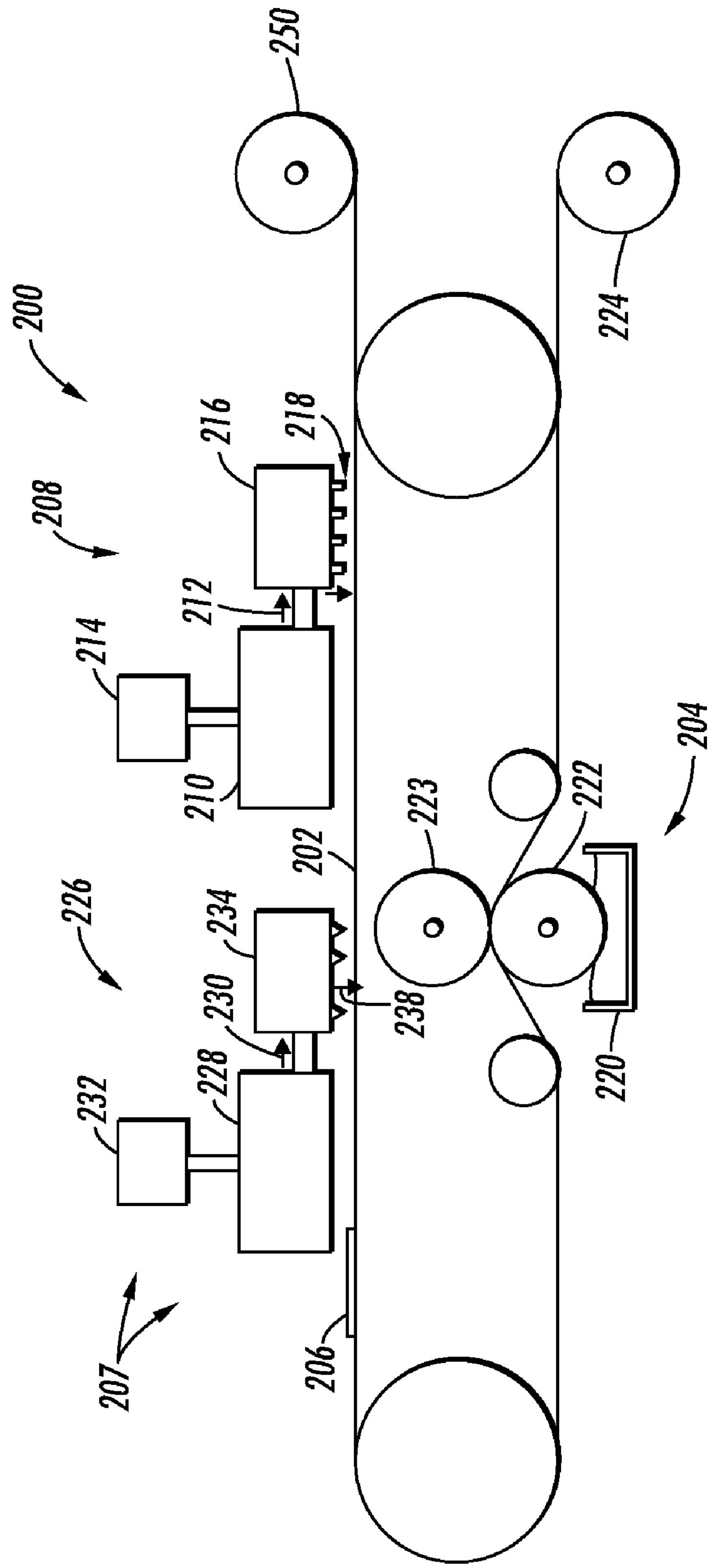
FIG. 2 is a plan view of another system for leveling ink.

Another printing system that enables leveling of image ink without a contact member is shown in FIG. 2. The system 200 applies gel ink to an image receiving member 202, similar to image receiving member 102 of FIG. 1. Rather than using a print head to apply ink to the member 202, however, the system 200 uses an ink applicator 204. The ink applicator 204 may be any ink applicator capable of applying ink to the image receiving member 202. The image receiving member 202 is a web substrate that is provided from a supply roll 224 and retrieved on a take-up roll 250. The web substrate may be, for example, a roll of paper, film, or foil packaging material. The supply roll 224 and take-up roll 250 are driven as known in the art to move the image receiving member through the ink applicator 204 and the second flow directing device 226 and the first flow directing device 208 of the leveling apparatus 207.

As shown in FIG. 2, the ink applicator 204 may be in the form of a rotogravure type ink applicator that includes a fountain 220 for storing gel ink and a cylinder 222 that is partially submerged in the fountain 220. The cylinder 222 is also in rolling contact with the image receiving member 202 and applies an image 206 to the image receiving member 202 as it passes by the ink applicator 204 in the counterclockwise direction. An impression cylinder 223 forms a nip with the gravure cylinder 222. The image receiving member 202 passes through the nip so an ink image is transferred from the cylinder 222 to the receiving member 202.

To redistribute the gel ink on the member 202, the system 200 further includes a leveling apparatus 207 having a first fluid flow directing device 208 and a second fluid flow directing device 226. The first fluid flow directing device 208 includes a first fluid source 214 that is coupled to a pressurized fluid generator 210. The generator 210 pressurizes the fluid and directs the fluid flow through the conduit 212 to the fluid flow director 216. The flow director 216 includes a plenum that is subdivided into sections, each of which has a slit 218 or similar opening that is oriented towards the image receiving member 202. The directed fluid flow redistributes the ink on the image receiving member 202 as it passes the leveling apparatus 207. The second fluid flow directing device 226 in system 200 may be similar to the first fluid flow directing device 208 and may cooperate with the first fluid flow directing device 208 to form the leveling apparatus 207. Thus, the second fluid flow directing device 226 is shown as including a second fluid source 232, a pressurized fluid flow generator 228, a conduit 230, and a fluid flow director 234. The second fluid flow directing device 226 provides a fluid flow 238 that is directed towards the image receiving member 202.

The fluid flow director 234 and the fluid flow director 216 may have similar structures. Accordingly, fluid flow director 216 is now described in particular. The slits 218 of the fluid director 216 may be spaced apart in any particular manner and may, for example, be parallel and equally spaced from each other. The slits 218 may be oriented to direct the fluid flow so it is normal or perpendicular to the direction of the image receiving member 202. Alternatively, the slits 218 may be angled with reference to the normal to the member 202 or oriented in any appropriate manner that levels or smoothes the gel ink on the receiving member 202. The slits 218 may also have any suitable shape. For example, the slits 218 may be round, square, rectangular or some other geometric or non-geometric shape and sized to provide a suitable flow of the fluid. In another embodiment, one or both of the fluid directors 216 and 234 may include a blower that directs fluid towards the image receiving member 202. Again, vanes or similar structures may be provided in the output stream of a blower to direct multiple streams towards the image receiving member 202.

In one embodiment of the system 200, the second fluid flow directing device 226 directs a flow of heated fluid 238 towards the image 206 on the image receiving member 202. The heated fluid heats the gel ink so it is more malleable and responsive to the flow of pressurized fluid generated by the first fluid flow directing device 208. In this embodiment, the fluid flow rate from the second fluid flow directing device is less than the fluid flow rate from the first fluid flow directing device.

The system 200 may be implemented in a number of configurations. For example, the heated relatively low pressure fluid flow may be steam or a dry gas fluid flow. In some applications, use of steam may be preferred because steam possesses a latent heat that is transferred to the gel ink, which softens the gel ink more quickly. The more highly pressurized flow may be a dry gas fluid that mechanically redistributes the softened gel ink without the adverse consequences of a contact member that is pressed against the gel ink. In other embodiments, the fluid flow from the first and the second fluid flow directing devices may be released from a fluid director at approximately the same pressure and temperature and both flows may be provided with the same type of gas. In these embodiments, the first fluid directing device 208 and the second fluid directing device 226 may utilize a common fluid source.

The parameters of the fluid flow from the first and the second fluid flow directing devices may be adjusted to provide for optimum leveling of the ink image 206. For example, the fluid may be heated to an optimal temperature to soften the gel ink at a particular distance from the fluid flow director with a flow rate that does not disrupt the image until it has been sufficiently softened. In another example, steam or super heated steam may be adjusted to a sufficient pressure and temperature to affect the ink without adversely impacting the image substrate. For example, substrates susceptible to moisture, such as paper and other porous materials, may be treated at temperatures and pressures that are different than images on non-porous substrates. In another example, steam at a suitable temperature and pressure may be used to level gel ink images on temperature sensitive packaging substrates, such as Melinex and polypropylene, which deform when subjected to temperatures much above 100° C. On the other hand, hot air at temperatures well above 100° C. may be used to level gel ink images on substrates with negligible temperature sensitivity, such as aluminum foil.

Figure 3:
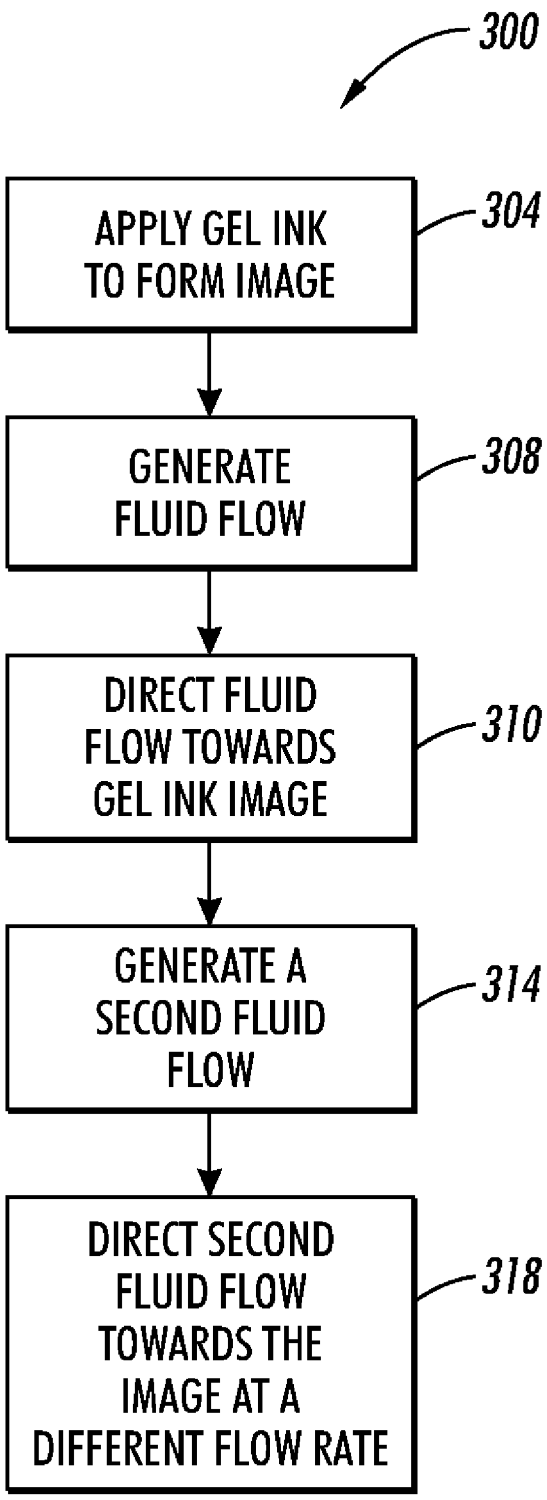
FIG. 3 is a flow diagram of a method of leveling ink.

A method of leveling gel ink on an image receiving member is shown in FIG. 3. The method 300 includes applying gel ink to an image substrate to form an image (block 304). The gel ink may be applied to the substrate with a transfer member or with a print head that ejects the ink. The method 300 further includes generation of a fluid flow (block 308). The fluid flow may be steam, heated air, or another type of gas. While the heating of the fluid may be useful in some applications, the fluid need not be necessarily heated. The generated fluid flow is then directed towards the gel ink image to level the ink on the image (block 310).

The method 300 of FIG. 3 may also include generation of a second fluid flow (block 314), which may use the same or a different fluid. The second fluid flow is then directed towards the ink image at a flow rate that is different than the first flow rate (block 318). The generation of a second fluid flow that is directed at a different flow rate may be included in the method 300 to level the ink on the image after the first fluid flow heats the gel ink. The heated fluid flow prepares the gel ink for redistribution and the second fluid flow, which is directed at a higher flow rate, redistributes the ink of the image. The second fluid flow may be, but is not necessarily, heated. The fluid flow that redistributes the ink may be generated with a flow rate sufficient to shear the ink, such as a flow rate of at least two (2) meters per second (m/s).

Figure 4:
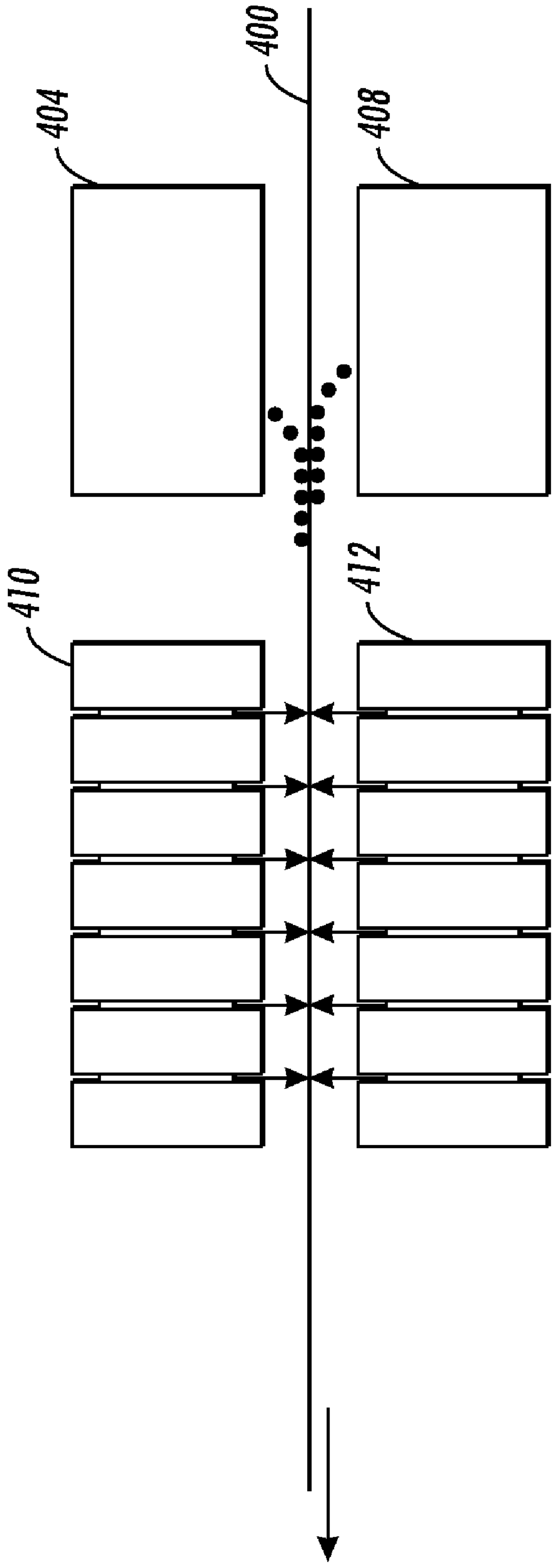
FIG. 4 is a view of a portion of a system that performs duplex printing and levels the ink on both sides of the image substrate substantially simultaneously.

The principles for leveling gel ink on an image substrate may be applied to systems that perform duplex printing as well. As shown in FIG. 4, a web 400 moves in a direction indicated by the arrow. A print head 404 ejects ink onto one surface of the web or image substrate 400 while another print head 408 ejects ink onto the opposing surface of the substrate. The print heads 404 and 408 are shown as printing an image on a surface of the web at different positions, although the two print heads may be directly opposite to one another. The fluid flow directors 410 and 412 are similar in structure to the fluid flow directors 216 and 234 of the first and second fluid flow directing devices 208 and 226 described above. These fluid flow directors directed a heated fluid flow towards an image on the substrate 400 as it passes the flow directors. The heat of the fluid flow and the shear arising from the flow velocity level the ink image as described above. The web 400 then continues through a UV curing station (not shown) for curing before being received at a take up roll. Although the flow directors 410 and 412 are shown as being opposite one another, they may be placed to treat one surface of the web 400 at different positions before the image is cured. As configured in FIG. 4, the velocity of the fluid from flow director 410 may be controlled to balance the velocity of the fluid flow from flow director 412 or vice versa.

Variations and modifications of the present invention are possible, given the above description. For example, the systems described above have included a pressurized plenum to achieve high gas flow to shear and level a gel ink image. Alternative techniques include high velocity fan type blowers that may be located with reference to an image receiving member to direct a heated or near-ambient fluid or gas flow towards an ink image to shear and level the ink image. Additionally, the systems and methods described herein may be used with the inks disclosed in the co-pending application identified above as well as other phase change inks that are capable of viscosity changes in response to heat. All variations and modifications, which are obvious to those persons skilled in the art to which the principles described above pertain, are considered to be within the scope of the protection granted by this Letters Patent.

What is claimed is:

1. A system for leveling gel ink applied to an image receiving member, comprising:

an ink applicator configured to apply gel ink onto an image receiving member to form a gel ink image on the image receiving member as the image receiving member passes by the ink applicator; and a fluid flow directing device configured to direct a flow of fluid towards the gel ink image on the image receiving member to re-distribute the ink on the image receiving member.

2. The system of claim 1, the fluid flow directing device being configured to direct the fluid flow in a direction substantially normal to the gel ink image on the image receiving member.

3. The system of claim 1, the fluid flow directing device comprising:

a steam directing device.

4. The system of claim 3, the steam directing device being configured to direct superheated steam towards the gel ink image on the image receiving member.

5. The system of claim 1, the fluid flow directing device comprising:

a steam knife.

6. The system of claim 5, the steam knife being comprised of:

a plenum chamber for receiving a flow of steam from a steam source; and at least one opening in the plenum chamber to direct the flow of steam from the plenum through the opening towards the gel ink image on the image receiving member.

7. The system of claim 1, the fluid flow directing device being comprised of:

an air knife.

8. The system of claim 7, the air knife being comprised of:

a blower that generates air flow and directs the air flow towards the gel ink image on the image receiving member.

9. The system of claim 1, the fluid flow directing device configured to direct a flow of fluid towards the gel ink image on the image receiving member with a flow velocity of at least two meters per second.

10. The system of claim 1 further comprising:

a second fluid flow directing device configured to direct a second flow of fluid towards the gel ink image on the image receiving member before the flow of fluid re-distributes the gel ink on the image receiving member.

11. The system of claim 10, wherein the second flow of fluid is a flow of steam.

12. The system of claim 10 wherein the fluid flow directing device is configured to direct the flow of fluid at a first flow rate and the second fluid flow directing device is configured to direct the second flow of fluid at a second flow rate that is different than the first flow rate.

13. The system of claim 10, the second fluid flow directing device further comprising:

a steam knife.

14. The system of claim 13, the steam knife comprising:

a plenum chamber for receiving a flow of steam from a steam source; and at least one opening in the plenum chamber to direct the flow of steam from the plenum through the at least one opening towards the gel ink image on the image receiving member.

15. The system of claim 11 wherein the steam is superheated steam.

* * * * *

UNITED STATES PATENT AND TRADEMARK OFFICE

CERTIFICATE OF CORRECTION

PATENT NO. : 8,123,345 B2
APPLICATION NO. : 12/023979
DATED : February 28, 2012
INVENTOR(S) : Gregory Joseph Kovacs et al.

It is certified that error appears in the above-identified patent and that said Letters Patent is hereby corrected as shown below:

In the Assignee, INID Code (73), on the cover page, please add --Palo Alto Research Center Incorporated, Palo Alto, CA (US)-- as an additional Assignee.

Signed and Sealed this
Thirty-first Day of July, 2012

David J. Kappos
*Director of the United States Patent and Trademark Office*